Nov. 3, 1959 H. J. WETZSTEIN ET AL 2,911,629

MAGNETIC STORAGE SYSTEMS

Filed June 25, 1958 3 Sheets-Sheet 1

INVENTORS
HANNS J. WETZSTEIN &
ZENARD KAWECKI

BY Morris Rabkin
ATTORNEY

INVENTORS
HANNS J. WETZSTEIN &
ZENARD KAWECKI
BY
Morris ... [signature]
ATTORNEY INVENTORS
HANNS J. WETZSTEIN &
ZENARD KAWECKI
BY
Morris [signature]
ATTORNEY 2,911,629

MAGNETIC STORAGE SYSTEMS

Hanns J. Wetzstein, Cochituate, and Zenard K. Kawecki, Brighton, Mass., assignors to Radio Corporation of America, a corporation of Delaware Application June 25, 1958, Serial No. 744,484

11 Claims. (Cl. 340—174)

This invention relates to storage systems, and particularly to magnetic storage systems for storing analog information.

Automatic control systems frequently receive, operate on, and transmit analog information. The analog information may be converted to digital type of information for processing by a digital computer and then reconverted back to the analog type. From time to time, it may be necessary to store the analog information, as by using linear capacitors. One difficulty with linear capacitors is that the stored information changes with time because these capacitors have a finite leakage resistance. Various expedients, such as mechanical switches or additional auxiliary equipment are used to lengthen the storage time. In certain prior control systems, the information is stored in digital form until needed because digitally stored information does not vary with time. However, these latter systems are expensive in equipment because a separate digital storage means is required for each different unit of analog information.

Magnetic cores of substantially rectangular hysteresis loop material can store information for an indefinitely long time. These cores, however, are generally unsuitable for storing information in analog form because their response characteristics vary from core to core, and because the response characteristic of any one core is not a linear function of the applied analog signal.

An object of the present invention is to provide improved analog storage systems using magnetic cores.

Another object of the invention is to provide improved analog storage systems which can be operated at relatively high speed and which have a relatively high degree of accuracy.

Still another object of the invention is to provide an improved analog storage system wherein the stored information is retained for an indefinitely long time.

According to the invention, the analog information is stored in multi-apertured cores. The stored information can be continuously read-out without change, or destruction of, the stored information. A feedback loop is arranged to sample the information actually stored in the core and to compare this stored information with the analog information desired to be stored. The feedback loop effectively forces the core to assume a state dictated by the incoming analog information. Therefore, the accuracy of the storage is substantially independent of the response characteristics of the core itself and depends only on the response characteristics of the feedback loop. The response characteristics of the feedback loop can be accurately controlled, say to 1% or better. Thus, the accuracy of the stored information in the present invention is higher than that of prior systems using magnetic core storage.

A feature of the invention is that the feedback loop may be time shared among a plurality of separate storage devices thereby reducing the auxiliary equipment required.

Figure 1:
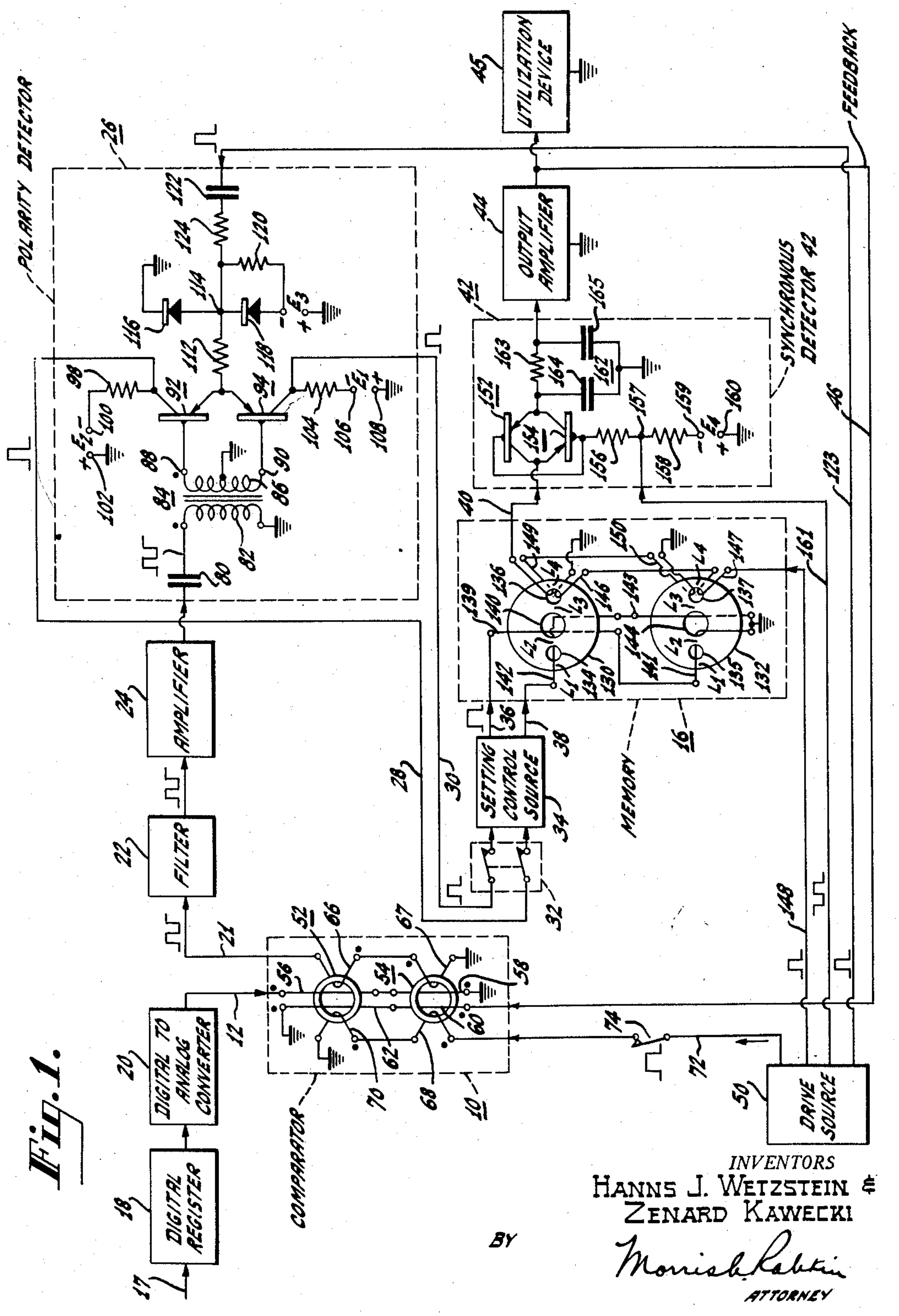
Fig. 1 is a schematic diagram of an analog storage system according to the invention.

In the storage system of Fig. 1, a comparator 10 has a first input 12 for receiving the analog signals desired to be stored and a second input for receiving a sampled feedback signal from the memory 16. In certain process control applications, the information is at certain times in digital form as when a digital computer is used in operating on the information. In such case, the digital information is applied to the input 17 of a digital register 18 which may be a flip-flop storage register. The outputs of the digital register 18 are applied to the inputs of a digital-to-analog converter 20 and are converted from digital form to analog form. The output of the converter 20 is connected to the first input 12 of the comparator 10. A suitable comparator for comparing the analog information signals is a magnetic-modulator type comparator described more fully hereinafter. The output of the comparator 10 appearing on the output line 21 is filtered in a selective filter circuit 22, amplified in an amplifier circuit 24, and applied to the input of a polarity detector 26. The polarity detector 26 provides an output signal on either one or the other of two output leads 28, 30 depending upon the polarity of the comparator 10 output signal. No output is produced by the polarity detector 26 in the absence of an input signal from the comparator 10. The polarity detector 26 output leads 28, 30 are connected via a switch 32 to a setting control source 34. The setting control source 34 applies a signal on one or the other of its two output leads 36 and 38 corresponding to the one or the other of the input signals on the phase detector output leads 28 and 30.

The read-out signal of the memory 16, appearing on its output lead 40, is applied to an input of a synchronous detector 42. The output signal of the synchronous detector 42 is amplified by an amplifier 44 and fed-back via a feedback line 46 to the feedback input of the comparator 10.

A drive source 50 is used to apply drive pulses at appropriate times to the comparator 10, the memory 16, the polarity detector 26, and the synchronous detector 42.

The closed feedback loop, includes the comparator 10, the polarity detector 26, the memory 16 and the synchronous detector 42 and operates as a so-called sampled data control system. These units of the feedback loop are described in more detail hereinafter. Each of the other units of the storage system, such as the digital register 18, the digital-to-analog converter 20, the filter circuit 22, the setting control source 34, the amplifiers 24 and 44 and the drive source 50 are well known in the art.

A pair of cores 52 and 54 of rectangular hysteresis loop material are used in the comparator 10 to compare the analog signals. These analog signals are in the form of D.C. (direct current) signals. The incoming analog signal appearing on the input lead 12 is connected in series with first control windings 56, 58 on the cores 52 and 54, respectively, to a common reference potential, indicated in the drawing by the conventional ground symbol. The feedback signal appearing on the feedback line 46 is connected in series with a pair of second control windings 60, 62 on the cores 54 and 52, respectively, to the common ground.

The conventional dot notation is used to indicate the sense of linkage of the various windings to the cores 52, 54. Positive (conventional) current flow into the dot terminal of a winding produces or tends to produce a flux change in the linked core. This flux change induces a voltage in each of the other windings linked to that core in a direction to make the dot terminals of these windings positive relative to their non-dot terminals. The first and second control windings 56 and 62 on the core 52 are linked in mutually opposite senses, as are the first and second control windings 58 and 60 on the second core 54. A pair of output windings 66 and 67 are linked to the cores 52 and 54 respectively, and are connected in series with each other in series-opposing relation between the common ground and the output line 21 of the comparator 10. A pair of drive windings 68 and 70 are linked to the cores 54 and 52, respectively, and are connected in series-aiding relation with each other between a first output 72 of the drive source 50 and the common ground. A single-throw, single-pole sampling switch 74 is connected in series between the drive source 50 and the drive windings 68 and 70.

In operation, in the absence of D.C. analog signals, symmetrical flux changes are produced in the cores 52 and 54 by drive currents applied to the drive windings 68 and 70. Accordingly, the output voltages induced in the output windings 67 and 66 are of equal amplitude and of opposite polarity and effectively cancel each other. The wave shape of the applied drive pulses contain only odd harmonics of the fundamental. Square-wave drive pulses are suitable. Accordingly, only odd harmonic frequency signals are induced in the output windings 66 and 67 in the absence of D.C. signals applied to the control windings of the cores 52 and 54. If the incoming and feedback signals are of different amplitudes, a net bias is applied to both the cores 54 and 52 with one core being biased in one direction of magnetization, and the other core being biased in the opposite direction. Accordingly, different amounts of flux change are produced in the cores 54 and 52 when the drive signals are applied to the drive windings 68 and 70. Thus a net output signal representing an error signal is applied to the comparator output 21. Because of the D.C. bias, the output signal appearing on the comparator output line 21 contains even harmonics of the fundamental of the drive signal. If the analog signal applied to the input terminal 12 is greater in amplitude than the feedback signal applied to the feedback input, the even order harmonic output signals at the output lead 21 are in phase with the drive signals applied to the drive windings. If, however, the feedback signal is of lesser amplitude than the incoming analog signal, the even order harmonic output signals at the output lead 21 are 180° out of phase with the drive signals.

The filter circuit 22 may, for example, be a selective band-pass filter having its pass band oriented at the second harmonic of the comparator 10 drive signal, and having strong rejection at the fundamental and third harmonic of the drive signal. The filter 22 also has a high input impedance with respect to the comparator 10 output signals thereby preventing loading of the comparator cores 52 and 54.

The polarity of the output signal of the filter circuit 22 represents an error signal indicating whether the amplitude of the input signal is greater than or less than the amplitude of the feedback signal. The filter circuit 22 output is amplified in a linear amplifier unit 24.

The output of the amplifier 24 is A.C. (alternating current) coupled by means of a capacitor 80 to the primary winding 82 of a linear pulse transformer 84 of the polarity detector 26. The secondary winding 86 of the pulse transformer 84 has a grounded mid-tap, and has a pair of end terminals 88 and 90 connected respectively to the base electrodes of a pair of gating transistors 92 and 94 of the PNP type. The collector electrode of the transistor 92 is connected in series with a collector resistor 98 to the negative terminal 100 of a supply source E2. The collector electrode of the other transistor 94 is connected in series with a collector resistor 104 to the negative terminal 106 of a supply source E1. The positive terminals 102 and 108 of the supply sources E2 and E1 are connected to ground. The emitter electrodes of both transistors 92 and 94 are both connected in series with an emitter resistor 112 to a common gating junction 114. The gating junction 114 is clamped above and below the ground reference potential by means of a pair of diode rectifiers 116 and 118. The rectifier 116 is poled to pass a positive conventional current from the gating junction 114 to ground. The rectifier 118 is poled to pass a negative polarity current from the gating junction 114 to ground. A bias source E3 applies a reference bias to the rectifier 118 by means of a bias resistor 120 connected between the negative terminal of the supply source E3 and the gating junction 114. Sampling pulses from the drive source 50 are A.C. coupled by means of a capacitor 122 and a resistor 124 to the gating junction 114. The polarity detector output leads 28 and 30 are connected across the collector resistors 98 and 104, respectively.

The particular arrangement of the memory 16 of Fig. 1 is described in a copending application, Serial No. 744,385, entitled "Magnetic Storage System" and filed concurrently herewith by Edward Dinowitz. It will be appreciated that other arrangements of multi-apertured storage cores can be used in the present invention.

The memory 16 has a pair of multi-apertured cores 130, 132 of substantially rectangular hysteresis loop material. Each of the cores 130, 132 may be a transfluxor core. A central aperture and a pair of smaller apertures on either side of the central aperture are located in each core to provide four legs of substantially equal cross-sectional area. The first smaller apertures 134 and 135 of the cores 130 and 132 are used as setting apertures, and the two other smaller apertures 136 and 137 in the cores 130 and 132 are used as output apertures. The output signals appearing on the first output lead 36 of the setting control source 34 are used to "block" the first transfluxor 130 and to "set" the second transfluxor 132, and vice versa for the setting control source output signals appearing on the second output lead 38. A first blocking winding 139 is linked through the central aperture 140 of the first core 130 and is connected in series to a first setting winding 141 wound on the middle leg L2 of the second transfluxor 132. A second setting winding 142 wound on the middle leg L2 of the first transfluxor 130 is connected in series with a second blocking winding 143 threaded through the central aperture 144 of the second transfluxor 132. After linking the first and second transfluxors 130, 132, the series-connected control windings are connected to the common ground. First and second drive windings 146 and 147 are respectively linked to the first and second transfluxor cores 130 and 132, through the output apertures 136 and 137.

The pair of drive windings 146 and 147 are connected in series-aiding relationship with each other between the third drive output line 148 of the drive source 50 and the common ground. First and second output windings 149 and 150 are linked to the first and second transfluxor cores 130 and 132 through the output apertures 136 and 137, respectively. The pair of output windings 149 and 150 are connected in series-opposing relationship between the output line 40 of the transfluxor memory 16 and the common ground. Thus, the drive and output windings 146 and 149 of the first core 130 are linked in opposite senses, while the drive and output windings 147 and 150 of the second core 132 are linked in the same sense.

The memory output line 40 is connected to the collector electrode of a first transistor 152 and the emitter electrode of a second transistor 154 of the synchronous detector 42. The base electrodes of both the pair of transistors 152 and 154 are connected in series with a voltage divider to the negative terminal 159 of a bias source E4. The pair of resistors 156 and 158 serve as a voltage divider. The positive terminal 160 of the source E4 is connected to ground. A fourth drive output line 161 of the drive source 50 is connected to a junction 157 between the voltage divider resistors 156 and 158. The emitter electrode of the first transistor 152 and the collector electrode of the second transistor 154 are each connected to the input of an RC filter circuit 162. The filter circuit 162 includes a series resistance 163 and a pair of capacitors 164, 165 each connecting one extreme terminal of the resistor 163 to ground. The output of the filter circuit 162 is applied to a linear output amplifier 44 used to apply a feedback signal to the feedback line 46, and to apply an analog output signal to a utilization device 45. The output amplifier 44 may be any suitable linear amplifier such as a grounded-emitter transistor amplifier.

Figure 2:
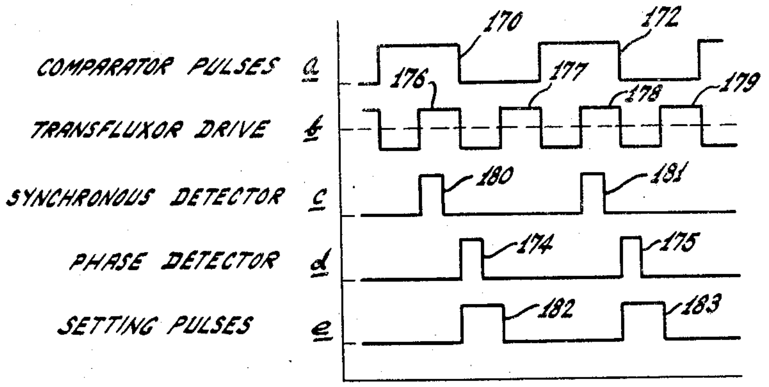
Fig. 2 is a timing diagram useful in explaining the operation of the system of Fig. 1.

The timing diagram of Fig. 2 is used in explaining the operation of the system of Fig. 1. The various waveforms of lines *a, b, c* and *d* of Fig. 2 are generated by the drive source 50. The drive source 50 may be any conventional source arranged to apply the various drive signals used in operating the system of Fig. 1. For example, a counter-type timing generator using multivibrator circuits may be used. For convenience of operation, it is assumed that the comparator circuit 10 is driven by square-wave pulses having a repetition rate of 100 kc. The comparator 10 drive pulses are indicated by the positive pulses 170 and 172 of line *a* of Fig. 2. In the absence of a net D.C. bias applied to the cores of the comparator 10, the square wave-drive pulses do not produce any 200 kc. output signals on the comparator output lead 21. This condition occurs when the memory system has reached a stabilized condition wherein the feedback signal appearing on the feedback line 46 is equal in amplitude to the input signal appearing on the input lead 12. When an unbalance between the input and feedback signals occurs, a net D.C. bias is applied to the comparator cores producing a 200 kc. output on the comparator lead output 21. The selective frequency filter 22 passes the 200 kc. signals from the comparator 10 and rejects signals on either side of the desired 200 kc. signals. The 200 kc. signals of the filter 22 are amplified in the linear amplifier 24 and flow through the primary winding 82 of the transformer 84 of the polarity detector 26. A gating pulse is applied to the gating line 123 by the drive source 50 after each comparator drive pulse, as indicated by the gating pulses 174 and 175 of line *d* of Fig. 2. Thus the polarity detector circuit gating is delayed one cycle in order to permit the new analog information to be compared with the information previously stored in the memory 16. Each of the transistors 92 and 94 of the polarity detector 26 is normally nonconductive. The polarity detector 26 gating pulses are of relatively short duration to sample the output of the filter circuit 22. The polarity detector gating pulses enable each of the transistors 92 and 94 at their emitter electrodes. When a positive polarity error signal is applied to the primary winding 82 during the gating interval, the upper transistor 92 becomes conductive to apply a positive output pulse to the polarity detector output lead 28. When a negative polarity signal is applied to the primary winding 82 during the gating interval the lower transistor 94 becomes conductive to apply a positive output pulse on the polarity detector output lead 30. The polarity detector output pulses pass through the normally closed switch 32 to the setting control source 34.

At the start of an operation, the transfluxor cores 130 and 132 may be in their blocked condition. The arrangement and operation of various types of transfluxors is described in an article by J. A. Rajchman and A. W. Lo, published in the March, 1955 Proceedings of the IRE entitled, "The Transfluxor." Briefly, a transfluxor is blocked by a positive (conventional) current flow in the blocking windings 139 or 143 of the cores 130 and 132.

In the blocked condition, the flux in all portions of the cores is oriented in one sense, for example, the clockwise sense with reference to the blocking apertures 140, 144. In the blocked condition, the drive signals applied to the drive windings do not produce any appreciable flux changes in the transfluxor cores and thus, no appreciable output voltage in the output windings. The transfluxor core 130 is changed from its blocked to its set condition by a positive (conventional) current flowing in the setting winding 142. Current flow in the setting winding 142 produces a flux change in the middle leg L2 of the core 130 from the initial clockwise to the counter-clockwise sense and a corresponding amount of flux change in the other middle leg L3. Note that the current flow in the setting winding 142 of the core 130 can not produce any permanent flux change in the outside leg L1 adjacent the setting aperture 134. No flux change is produced in the outside leg L1 because the flux is already in the clockwise sense, the sense in which the setting magnetizing force tends to change flux in the leg L1. Thus, the maximum setting of the transfluxor core 130 corresponds to that produced by changing all the flux in the middle leg L2. If the maximum flux change in the middle leg L2 corresponds to one unit, then the maximum flux change in the other middle leg L2 and the other outside leg L4 can only be one unit. The transfluxor core 130, however, has a plurality of discrete set conditions between its maximum set condition and its blocked condition. Each different one of these discrete set conditions corresponds to a different analog input signal greater in amplitude than a base reference. The discrete set conditions of the other transfluxor 132 correspond to different analog input signals below the base reference.

Although the correspondence between the analog input signals and the set conditions of the cores exists, it is not an exact one-to-one correspondence between incremental changes in amplitude of the input signals and incremental flux changes in the cores, in the absence of the closed feedback loop. For example, a given flux change $\Delta\phi$ may be required in the changing from one analog input signal to the next higher analog signal, while a flux change $\Delta\phi 1$ may be required in changing from the higher to the still next higher analog signal, where $\Delta\phi$ is not equal to $\Delta\phi 1$. However, because of the feedback loop, the desired one-to-one correspondence is established within the accuracy of the feedback loop, which in the present embodiment is 0.25% or better.

Note that the current flowing in the setting winding 142 of the core 130 also flows in the blocking winding 143 of the core 132. Thus, a setting current applied to the control source output lead 38 increases the setting of the core 130 and decreases the setting of the core 132. The setting current flowing in the setting winding 141 of the core 132 also flows in the blocking winding 139 of the core 130, so that when the setting of the core 132 is increased, the setting of the core 130 is decreased.

The drive source 50 applies alternating polarity drive pulses at the 200 kc. repetition rate to the drive windings 146 and 147 of the transfluxor cores 130 and 132. The transfluxor drive pulses are indicated in line *b* of Fig. 2 by the four cycles 176—179. The first negative polarity drive pulse of a cycle reverses any set flux in the legs L3 and L4 of a transfluxor to the opposite sense. The positive polarity drive pulse of a cycle returns the reversed flux back to the initial set sense. Each time flux is reversed in the legs L3 and L4 of a core, an output voltage is induced in the output winding of the core. When a greater amount of flux is reversed in the core 130, the output signal appearing on the memory output line is in phase with the positive polarity drive pulse. When a greater amount of flux is reversed in the core 132, the memory output signal is 180° out of phase with the positive polarity drive signal. The amplitude of the memory output signal represents the difference between the amounts of flux changed in the two cores 130 and 132.

The synchronous detector 142 is gated during the positive polarity drive pulse of alternate ones of the transfluxor drive cycles, as indicated by the positive pulses 180 and 181 of line *c* of Fig. 2.

Each of the PNP type transistors 152 and 154 of the synchronous detector 42 is normally in its non-conductive condition. A positive pulse appearing on the memory output line 40 causes the transistor 154 to be conductive during the gating pulse applied to the gating line 161. A negative pulse applied to the memory output lead 40 causes the transistor 152 to become conductive during the gating pulse applied to the gating line 161. The current flow in the emitter-collector path of the transistor 154 is in a direction to apply charge to the capacitors 164 and 165 of the filter circuit 162; and current flow in the collector-emitter path of the transistor 152 is in a direction to decrease the charge on the filter capacitors 164 and 165. Thus the filter circuit 162 is made to assume a D.C. potential corresponding to that of the memory output line 40 during each gating interval of the synchronous detector 42. The output amplifier 44 amplifies the D.C. potential and causes a corresponding D.C. current to flow in the feedback line 46. The feedback signal is then compared with the analog input signal in the manner described to produce an error signal. The polarity detector 26 then detects the error signal and applies an appropriate signal to the setting control source 34. The control source 34 amplifies and stretches the gated output pulses from the phase detector 26, as indicated by the longer duration pulses 182 and 183 of line *e* of Fig. 2. In practice, it is found that longer duration setting pulses are desirable in setting the transfluxor cores 130 and 132 of the memory 16. Each setting pulse changes the previous set conditions of the transfluxor cores 130 and 132 in a direction to make the feedback signal equal to the analog input signal. The process continues in stepwise fashion until the feedback signal is equal to the analog input signal. At this time no further output pulses are produced by the polarity detector 26 due to the absence of the 200 kc. output from the comparator 10 and no further setting pulses are applied to the transfluxor cores 130, 132. The memory 16 retains this set condition for an indefinitely long time. Setting pulses are applied to the transfluxor cores during alternate memory drive cycles in order to permit any transient signals produced in the feedback loop to die out before a new setting signal is applied.

The switch 32 coupling the polarity detector 26 to the setting source 34, and the switch 74 coupling the drive source 50 to the comparator 10 may be opened once the analog input signal is stored in the memory 16.

Figure 3:
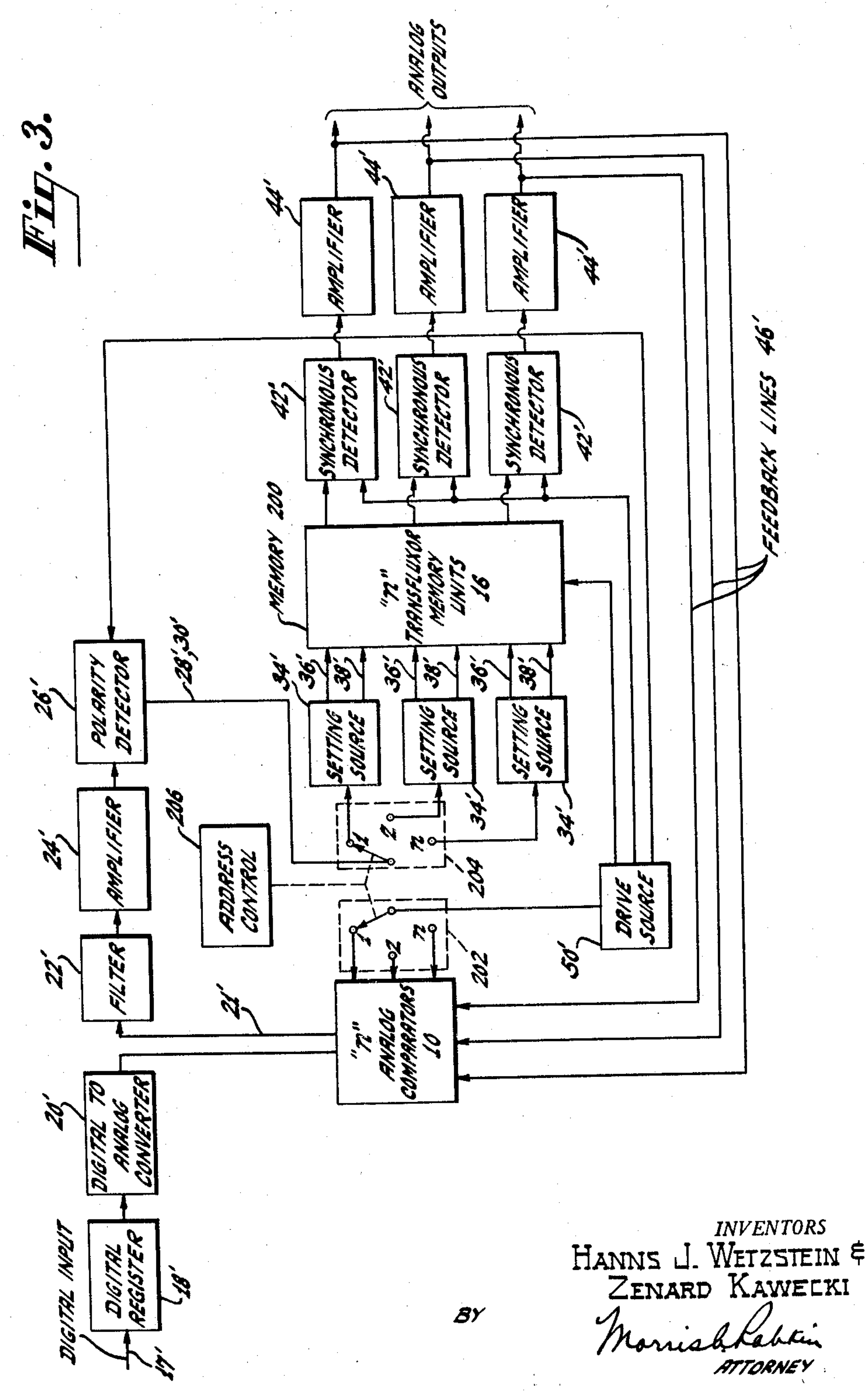
Fig. 3 is a schematic diagram of an embodiment of the invention using a single feedback loop with "$n$" analog storage devices.

In the memory system of Fig. 3, "*n*" separate analog signals are stored in a memory 200. Similar elements to those of Fig. 1 are identified by similar reference numerals with the addition of a prime. The switch 74 of Fig. 1 is replaced in Fig. 3 by a selective switch 202 having a single input and "*n*" outputs, such as "*n*" position stepping switch. The arm of the stepping switch 202 is connected to the drive source 50′. The switch 34 of Fig. 1 is replaced with another selective switch having a single input and "*n*" outputs, such as a stepping switch 204. For convenience of drawing, the stepping switch 204 is shown in simplified form as having a single bank. In practice, two identical banks may be used with the two arms respectively connected to the two output leads 28′ and 30′ of the polarity detector 26′. The "*n*" outputs of the stepping switch 204 are connected to "*n*" setting sources 34′. The outputs 36′ and 38′ of the "*n*" setting sources 34′ are used to control the setting of the "*n*" transfluxor pairs 10 of the memory 200. An address control unit 206 is used to operate both the selecting switches 202 and 204.

The operation of the system of Fig. 3 is similar to that of Fig. 1. A desired one of the comparator units 10 is connected to receive drive pulses from the source 50′ by the address control unit 206. The analog output of the converter 20′ may be applied to the first control windings 56, 58 of all the comparator units 10. However, only the desired comparator unit 10 provides output signals to the comparator output line 21′. Any error signals produced by the desired comparator unit 10 are applied to a corresponding one of the transfluxor memory units 16. The address control 206 selects the corresponding memory unit 16. The memory unit 16 output is fed back on the connected feedback line 46′ to the selected comparator unit 10.

If desired, a single setting source 34′ and a single synchronous detector 42′ also may be time-shared in similar manner to the time-sharing of the polarity detector 26′.

The accuracy of the memory systems of the invention can be further increased by compensating for so-called "elastic" flux changes produced by the setting signals. Practical core materials do not exhibit the ideal rectangular shape assumed for the hysteresis loops. Therefore, a setting signal does produce some transient flux change in a core due to the finite slope of the horizontal portion of the hysteresis curve. This flux change is not permanent as the core returns substantially to the same remanent condition after the setting signal is removed. Also, the amount of elastic flux produced by a given setting signal depends somewhat on the past history of the core excitation and on the core temperature.

Figure 4:
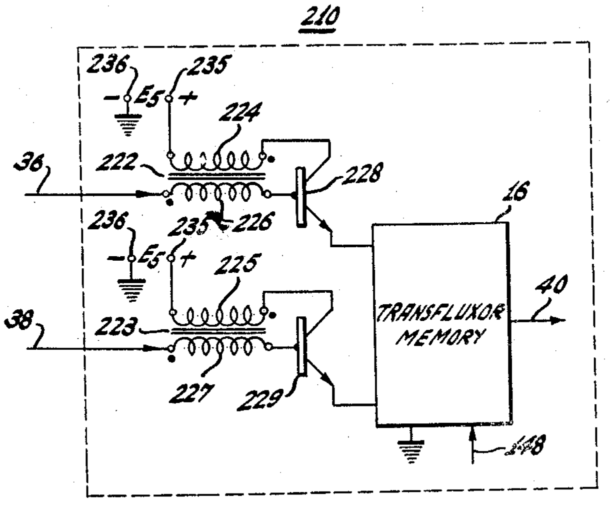
Fig. 4 is a schematic diagram of a compensating circuit which may be used with the storage systems of Figs. 1 and 3 to obtain increased accuracy.

An "elastic" flux compensating circuit for a memory 16 is shown in Fig. 4. The compensating circuit 210 includes a pair of cores 222, 223 each made of the same material as the transfluxors and each having a primary winding 224, 225 and a secondary winding 226, 227. The secondary windings 226, 227 have their dot terminals connected to the outputs 36, 38 respectively, of the setting control source 34. The unmarked terminals of the secondary windings 226, 227 are connected respectively to the base electrodes of a pair of drive transistors 228, 229. The primary windings 224, 225 have their dot terminals connected to the collector electrodes of the drive transistors 228, 229 and have their unmarked terminals connected to the positive terminal 230 of a supply source E5. The negative terminal 236 of the source E5 is connected to ground. The emitter electrodes of the drive transistors 228, 229 are connected respectively in series with one setting and one blocking winding of the transfluxor cores 130, 132 (Fig. 1) to ground.

In operation, the thermal environment of the cores 222, 223 is the same as that of the transfluxor cores. Thus, the effects on the "elastic" flux are the same for the cores 222, 223 and the transfluxor cores. The secondary windings 226, 227 are always pulsed in the same direction to apply a positive base input signal to the drive transistors 228, 229. Thus, the core 222 is always driven to saturation in the same direction by setting current flow in its primary winding 224. The current flow in the core 222 primary winding 224, thus is substantially the same as the current flow in the windings of the transfluxors. The voltage induced across the core 222 primary winding therefore is opposite in polarity from, and of approximately the same amplitude as that produced in the windings of the transfluxor cores as a result of the elastic flux changes. Thus, the net voltage applied across the transfluxor core windings produces only the desired permanent flux changes.

There have been described herein improved analog storage systems using multi-apertured storage cores interconnected in a closed feedback loop. The feedback loop operates to change the state of the storage core in incremental fashion until the actual state of the storage core closely corresponds to the desired analog signal. The feedback loop may be multiplexed among a plurality of storage cores for storing a plurality of different analog signals.

What is claimed is:

1. An analog storage system comprising a plurality of transfluxor storage units, means for reading the information stored in a desired one of said units and producing a corresponding signal, comparing means having one input coupled to receive said reading means signal and having another input for receiving a signal corresponding to information desired to be stored, said comparing means providing an output signal when said compared signals are unequal, and setting means responsive to said comparing means output signal, said units having analog set conditions responsive to said setting means.

2. An analog storage system comprising a plurality of transfluxor storage units, said units each having a plurality of set conditions respectively corresponding to the storage of different analog signals, means for reading the information stored in a desired one of said storage units, comparing means having first and second inputs and an output, means coupling said reading means to said comparing means first input, said comparing means receiving information signals to be stored at said second input and providing an output signal at said output upon inequality between said compared information, setting means responsive to said comparing means output signal, and means coupling said setting means to said desired storage unit, said setting means operating to change said desired unit to the one of said set conditions corresponding to the received information signals.

3. An analog storage unit comprising a plurality of transfluxor units each having a plurality of set conditions respectively corresponding to the storage of a plurality of analog signals, a plurality of setting means each coupled to a different one of said transfluxor units, a plurality of reading means each coupled to a different one of said transfluxor units, a comparing means having a first input for receiving input analog signals to be stored, a second input for receiving signals representing the stored information in a desired one of said transfluxor units, and an output for providing a signal upon inequality between said compared signals, and means selectively coupling one of said setting means and one of said reading means to a desired one of said transfluxor units.

4. An analog storage system comprising a plurality of transfluxor storage units, a plurality of reading means each coupled to a different one of said transfluxor units for producing signals corresponding to the information stored in said transfluxor units, comparing means having a first input for receiving analog signals to be stored, and a second input for receiving signals representing stored analog signals, means coupling the said reading means of a desired one of said transfluxor units to said comparing means, said comparing means providing an output signal upon inequality between said compared signals, and setting means responsive to said comparing means output signal, said units having analog set conditions responsive to said setting means.

5. An analog storage system comprising a plurality of transfluxor storage units each having distinct set conditions, a plurality of feedback lines each coupled to a different said transfluxor unit and each having signals induced therein representing the set condition of that transfluxor unit, a comparing means connected to said feedback lines and connected to receive an analog signal to be stored, said comparing means comparing said signal to be stored with any desired one of said induced signals representing the stored information in the corresponding one transfluxor unit, and setting means connected to said comparing means, said setting means responsive to said comparing means for changing the set condition of said one transfluxor unit.

6. An analog storage system comprising a plurality of transfluxor units each having distinct set conditions, a plurality of feedback loops each having a normally open and a closed condition, any closed feedback loop including a setting means for changing the set conditions of a desired one of said transfluxor units, a reading means for reading the information stored in said one transfluxor unit, a comparing means for comparing said stored information with analog information desired to be stored, said setting means being responsive to said comparing means, and means for selectively closing one of said loops.

7. An analog storage system as claimed in claim 6, said feedback loops being normally open between said comparing means and said setting means.

8. An analog storage system comprising a transfluxor storage unit, means for reading the information stored in said unit and for producing a corresponding signal, comparing means having one input for receiving said reading means signal and having another input for receiving analog information desired to be stored, said comparing means providing an output signal when said compared signals are unequal, and setting means responsive to said comparing means output signal for changing the set condition of said unit.

9. A memory system comprising a multi-apertured core of substantially rectangular hysteresis loop material, first winding means linked to said core through one aperture for setting the remanent flux in said core to different conditions, second winding means linked to said core through another of said apertures having signals induced therein corresponding to the set response condition of said core, a comparing means for comparing said induced signals with signals desired to be stored in said core, and setting means responsive to said comparing means for applying signals to said first winding means for changing the response condition of said core.

10. A memory system comprising a multi-apertured core of rectangular hysteresis loop material, setting, drive, and output windings linked to said core, said setting windings operating to set the flux in the core portions adjacent one of said apertures in desired senses with respect to said one aperture, said drive and output windings being linked to said core through said one aperture, drive signals applied to said drive winding producing output signals having an amplitude corresponding to the flux settings in said core portions, a feedback loop including a comparing means, a setting means, and an output means connected between said setting windings and said output winding, said comparing means having a first input for receiving an input signal and a second input connected to receive said output winding signals, said comparing means providing an output signal representing the difference between said compared signals, said comparing means output signal operating said setting means to apply signals selectively to said setting windings to set the flux in said core portions so that the said output winding signals correspond to said input signal.

11. A memory system comprising a signal comparing means, a setting means, a multi-apertured core of substantially rectangular hysteresis loop material, and an output means in that order, said signal comparing means having a first input for receiving a signal to be stored and a second input for receiving a signal from said output means, and having an output connected to said setting means, said core having first and second windings linked through one of said apertures and connected to receive energization from said setting means, a drive and an output winding linked through another of said core apertures, drive signals applied to said drive winding inducing output signals in said output winding in accordance with the flux conditions in the portions of said core material adjacent said other aperture, said output device being connected to receive said induced output signals and apply a corresponding signal to said comparing means, and said comparing means producing a succession of output signals to successively change the said flux conditions in said core portions according to the comparison in said comparing means.

No references cited.